(12) United States Patent
Hayashi et al.

(10) Patent No.: US 6,884,482 B2
(45) Date of Patent: Apr. 26, 2005

(54) FUEL CONTAINER HAVING EXCELLENT GASOLINE BARRIER PROPERTIES

(75) Inventors: Nahoto Hayashi, Pasadena, TX (US); Hong-Ta James Chan, Houston, TX (US); Keizo Michihata, Sapporo (JP)

(73) Assignee: Kuraray Co., Ltd., Kurashiki (JP)

( * ) Notice: Subject to any disclaimer, the term of this patent is extended or adjusted under 35 U.S.C. 154(b) by 85 days.

(21) Appl. No.: 09/817,029

(22) Filed: Mar. 27, 2001

(65) Prior Publication Data
US 2002/0176955 A1 Nov. 28, 2002

(51) Int. Cl.$^7$ .................. B29D 22/00; B29D 23/00; B32B 1/08; B65D 6/00; B65D 8/00
(52) U.S. Cl. .................. 428/36.7; 428/36.6; 428/36.91; 220/562; 220/4.13; 220/4.14; 220/62.22
(58) Field of Search ............... 428/36.7, 36.6, 428/36.91; 220/562, 4.13, 4.14, 62.22

(56) References Cited

U.S. PATENT DOCUMENTS

| 2,716,075 A | | 8/1955 | Wiese et al. |
| 6,033,749 A | * | 3/2000 | Hata et al. .................. 428/36.7 |
| 6,146,709 A | | 11/2000 | Katz et al. .................. 427/447 |
| 6,398,059 B1 | * | 6/2002 | Hayashi et al. .............. 220/562 |

FOREIGN PATENT DOCUMENTS

| CA | 2263038 | 1/2000 |
| DE | 26 10 263 | 6/1977 |
| EP | 0 339 742 | 11/1989 |
| EP | 0 742 096 A2 | 11/1996 |
| EP | 0 759 359 | 2/1997 |
| EP | 1 072 399 | 1/2001 |
| EP | 1 108 599 A3 | 6/2001 |
| EP | 1 122 113 | 8/2001 |
| EP | 1 166 892 | 1/2002 |
| JP | 55-133920 | 10/1980 |

OTHER PUBLICATIONS

U.S. Appl. No. 10/796,072, filed Mar. 10, 2004, Michihata et al.

U.S. Appl. No. 10/796,012, filed Mar. 10, 2004, Michihata et al.

U.S. Appl. No. 09/817,029, filed Mar. 27, 2001, Hayashi et al.

* cited by examiner

Primary Examiner—Harold Pyon
Assistant Examiner—Catherine A. Simone
(74) Attorney, Agent, or Firm—Oblon, Spivak, McClelland, Maier & Neustadt, P.C.

(57) ABSTRACT

A fuel container formed by bonding upper and lower sections, for which both the upper and lower sections are made by thermo-forming a multi-layer sheet that comprises an interlayer of a barrier resin (A) and inner and outer layers of a polyolefin (B), and of which the surface of the innermost layer is coated with a layer of a barrier material (C).

16 Claims, No Drawings

FUEL CONTAINER HAVING EXCELLENT GASOLINE BARRIER PROPERTIES

BACKGROUND OF THE INVENTION

1. Field of the Invention

The present invention relates to a multi-layer fuel container.

2. Description of the Related Art

For storing hydrocarbons such as gasoline therein, molded plastic containers are favorably used these days, and one example is a fuel tank for automobiles. For plastics for that use, polyethylene (especially, very-high-density polyethylene) is considered good as it is inexpensive and easy to mold and has good mechanical strength. However, fuel tanks of polyethylene are known to have a drawback in that vapor or liquid of gasoline stored therein often evaporates away in air through the container wall of polyethylene.

To solve the problem, disclosed is a method of introducing a halogen gas (e.g., fluorine, chlorine, bromine) or sulfur trioxide ($SO_3$) into a polyethylene container to thereby halogenate or sulfonate the inner surface of the container. To facilitate the halogenation or sulfonation of the inner surface of the container, disclosed is a fuel tank for automobiles, of which the upper and lower sections both of a synthetic resin are bonded under heat and pressure with a conductor put in the bonded part of the two sections, and in which the conductor is melted under heat in the bonded part of the two sections (Japanese Utility Model Laid-Open No. 62325/1985).

On the other hand, disclosed is a method of forming a multi-layer structure of a polyamide resin and a polyethylene resin (Japanese Patent Laid-Open No. 134947/1994, U.S. Pat. No. 5,441,781). Known is a method of forming a multi-layer structure of an ethylene-vinyl alcohol copolymer (hereinafter referred to as EVOH) resin and a polyethylene resin (U.S. Pat. No. 5,849,376, EP 759,359). Also known is a multi-layer fuel tank with a barrier layer shifted to the inside thereof for improving the gasoline barrier properties of the tank (U.S. Pat. No. 6,033,749, Japanese Patent Laid-Open No. 29904/1997, EP 742,096).

SUMMARY OF THE INVENTION

The present invention relates to a fuel container formed by bonding upper and lower sections, for which both the upper and lower sections are made by thermo-forming a multi-layer sheet that comprises an interlayer of a barrier resin (A) and inner and outer layers of a polyolefin (B), and of which the surface of the innermost layer is coated with a layer of a barrier material (C).

DETAILED DESCRIPTION OF THE INVENTION

As compared with conventional metal fuel containers, plastic fuel containers have many advantages and are being much used these days. Plastic containers are lightweight and their shapes are not limited so much. Therefore, one their advantage is that their volume can be increased as much as possible for the space where they are used. Another is that, when they have received a impact, they are deformed and are therefore prevented from being broken.

Though having such advantages, plastic fuel containers are often problematic in point of their gas barrier properties, when compared with metal fuel containers. To solve the problem, multi-layer fuel containers of polyethylene and EVOH having good gasoline barrier properties have been proposed. Their gasoline barrier properties are better than those of conventional plastic fuel containers.

For improving the gasoline barrier properties and the impact resistance of such multi-layer fuel containers of polyethylene and EVOH, disclosed is a fuel container (tank) which comprises an interlayer (c) of an ethylene-vinyl alcohol copolymer sandwiched between inner and outer layers (a) of high-density polyethylene via an adhesive resin layer (b) therebetween, and of which the layer constitution is so controlled that the ratio of the overall thickness, I, of the layers positioned inside the layer (c) to the overall thickness, O, of the layers outside the layer (c), I/O, is smaller than 50/50 (U.S. Pat. No. 6,033,749).

The related art reference says that the layer constitution of shifting the EVOH layer (c) to the inside of the fuel tank improves the gasoline barrier properties and the impact resistance of the fuel tank, but says that the EVOH layer (c) should not be the innermost layer of the fuel tank. Regarding the reason for the specific layer constitution therein, the reference says as follows: The fuel tank is formed in blow molding, like ordinary plastic fuel containers, and the process of forming it in such blow molding includes a pinching-off step of sealing the open end of a cylindrical melt parison by closing a mold. In the pinching-off step, the innermost layers of the opposite open-end edges of the parison are butt-sealed to close the open end of the parison. If the adhesion strength of the pinch-off part of the closed parison is low, the impact resistance of the fuel tank finally formed from the parison is low as a whole. Therefore, the innermost layer of the fuel tank must be a combination of the high-density polyethylene layer (a) and the adhesive resin layer (b).

Differing from the fuel tank disclosed in the related art reference, the fuel container of the invention is formed by bonding upper and lower sections, for which both the upper and lower sections are made by thermo-forming a multi-layer sheet that comprises an interlayer of a barrier resin (A) and inner and outer layers of a polyolefin (B), and of which the surface of the innermost layer is coated with a layer of a barrier material (C).

One preferred embodiment of producing the fuel container of the invention includes thermo-forming a multi-layer sheet that comprises an interlayer of a barrier resin (A) and inner and outer layers of a polyolefin (B) into two thermo-formed multi-layer sections, then coating the inner surface of each section with a layer of a barrier material (C), and thereafter heat-sealing the open-end edges of the two sections to complete a fuel container. In this, the open-end edges of the two sections to be heat-sealed will be referred to as heat-sealing open-end edges. In the process of producing the fuel container, more preferably, the inner surface of each thermo-formed multi-layer except the heat-sealing open-end edge thereof is coated with a layer of a barrier material (C).

When compared with conventional plastic fuel containers, the fuel container of the invention has the following advantages.

One advantage is that the fuel container of the invention has extremely good gasoline barrier properties, as its innermost surface is coated with a layer of a barrier material (C). Conventional multi-layer fuel containers generally comprise an interlayer of a barrier resin and inner and outer layers of a polyolefin, in which the innermost layer must be a polyolefin layer, as so mentioned hereinabove. Therefore, when they are filled with fuel, the innermost polyolefin layer thereof is kept in direct contact with fuel, and is therefore exposed to fuel for a long period of time. As a result, one problem with such conventional fuel containers is that the innermost polyolefin layer is often swollen with fuel. If their inner resin layer is swollen with fuel, the used fuel containers are difficult to recycle. Removing fuel from the resin layer is costly, and this is an obstacle to recycling plastic fuel containers.

Of the fuel container of the invention, the surface of the innermost layer, preferably the entire surface thereof is coated with a barrier material (C). Therefore, in this, the inner resin layer is protected from being kept in direct contact with fuel, and is therefore extremely effectively prevented from being swollen with fuel.

The fuel container of the invention is formed by heat-sealing the open-end edges of thermo-formed, upper and lower multi-layer sections. When having received a impact, ordinary multi-layer fuel containers that are formed by heat-sealing the open-end edges of thermo-formed, upper and lower multi-layer sections are often broken at their heat-sealed area. For one reason for it, the part of the inner side of the tank to be kept in direct contact with fuel in the heat-sealed part thereof is compared with the part of the outer side thereof protruding in the direction of the thickness of the wall, in point of the difference in the degree of swelling with fuel therebetween, and it is understood that the two parts in the heat-sealed area differ in the degree of swelling with fuel, or that is, the degree of swelling with fuel of the heat-sealed part of the inner side of the tank is larger than that of the heat-sealed part of the outer side of the tank, and, as a result, the heat-sealed area of the tank is readily strained. The fuel container of the invention is free from the problem, since the surface of the heat-sealed part of the inner side of the tank is coated with a barrier material (C). This is another advantage of the fuel container of the invention.

The method of coating the surface of the innermost layer of the fuel container of the invention with a layer of a barrier material (C) is not specifically defined. One preferred method is a solution-coating or emulsion-coating method. For producing the fuel container of the invention, its upper and lower sections are first formed, and then they are bonded. Therefore, before they are bonded, the inner surface of the upper and lower sections is readily coated with a barrier material (C) in a mode of solution coating or emulsion coating. Contrary to this, co-extrusion blow-molded containers are almost closed when they are formed, and post-processing their innermost layer is extremely difficult.

U.S. Pat. No. 6,033,749 says that the method of producing the fuel tank of the patent includes, for example, extrusion molding, blow molding and injection molding. It further says that co-extrusion molding and co-injection molding are preferred in producing the fuel tank, and co-extrusion blow molding is the best of all. However, it suggests nothing about a fuel tank to be formed by bonding its upper and lower sections, both of which are made by thermo-forming a multi-layer sheet that comprises an interlayer of a barrier resin (A) and inner and outer layers of a polyolefin (B).

The method for preparing a solution of the barrier material (C) to be applied to the surface of the inner layer of the fuel container of the invention in a mode of solution coating is not specifically defined. The barrier material (C) for use in the invention is preferably EVOH, and a solution of EVOH may be prepared in any known method, for example, as in U.S. Pat. No. 5,053,257.

The method for preparing an emulsion of the barrier material (C) to be applied to the surface of the inner layer of the fuel container in a mode of emulsion coating is not also specifically defined. The barrier material (C) for use in the invention is preferably EVOH, and an emulsion of EVOH may be prepared in any known method, for example, as in U.S. Pat. No. 5,272,200.

In view of its storage stability and the flexing resistance of its film, the EVOH emulsion for use in the invention is preferably prepared as follows: An EVOH emulsion that comprises a dispersoid of EVOH having an ethylene content of from 20 to 60 mol % and a degree of saponification of at least 85% is prepared in a known manner, and a different EVOH having an ethylene content of from 5 to 15 mol % and a degree of saponification of at least 85% is added to the EVOH emulsion.

The method of adding the different EVOH having an ethylene content of from 5 to 15 mol % and a degree of saponification of at least 85% to the EVOH emulsion that comprises a dispersoid of EVOH having an ethylene content of from 20 to 60 mol % and a degree of saponification of at least 85 mol % is not specifically defined. In this, EVOH having an ethylene content of from 20 to 60 mol % and a degree of saponification of at least 85 mol % is referred to as EVOH (c1), and EVOH having an ethylene content of from 5 to 15 mol % and a degree of saponification of at least 85% is as EVOH (c2). For example, dry EVOH (c2) is added to the EVOH emulsion of which the dispersoid is EVOH (c1); or EVOH (c2) is dissolved in a mixed solvent of water and an alcohol (e.g., methanol, ethanol, propanol), and added to the EVOH (c1) emulsion; or EVOH (c2) is dissolved in water to prepare its aqueous solution, and the aqueous solution is added to the EVOH (c1) emulsion. Contrary to these, an EVOH (c1) emulsion may be added to dry EVOH (c2) or to a solution of EVOH (c2).

Of those, preferred is the method that comprises dissolving EVOH (c2) in water to prepare its aqueous solution followed by adding the aqueous solution to an EVOH emulsion of which the dispersoid is EVOH (c1), more preferably with stirring the EVOH (c1) emulsion, in view of its simplicity and of the storage stability of the EVOH emulsion produced therein.

In the EVOH emulsion, the blend ratio of EVOH (c1) and EVOH (c2) is preferably such that the amount of EVOH (c2) falls between 0.05 and 100 parts by weight relative to 100 parts by weight of EVOH (c1). More preferably, the lowermost limit of the blend ratio of EVOH (c2) is at least 0.1 parts by weight relative to 100 parts by weight of EVOH (c1), even more preferably at least 0.5 parts by weight, still more preferably at least 1 part by weight, most preferably at least 5 parts by weight. Also more preferably, the uppermost limit of the blend ratio of EVOH (c2) is at most 90 parts by weight relative to 100 parts by weight of EVOH (c1), even more preferably at most 80 parts by weight, still more preferably at most 50 parts by weight, most preferably at most 30 parts by weight.

If the blend ratio of EVOH (c2) is smaller than 0.05 parts by weight relative to 100 parts by weight of EVOH (c1), there is possibility that the storage stability of the EVOH emulsion will be low, and the flexing resistance of the film of the EVOH emulsion will be poor. On the other hand, if the blend ratio of EVOH (c2) is larger than 100 parts by weight relative to 100 parts by weight of EVOH (c1), there is possibility that the storage stability of the EVOH emulsion will be also low, and the water resistance and the barrier properties of the film of the EVOH emulsion will be poor.

The water content of the EVOH emulsion preferably falls between 60 and 1500 parts by weight relative to 100 parts by weight of the total of EVOH (c1) and EVOH (c2). More preferably, the lowermost limit of the water content is at least 70 parts by weight, even more preferably at least 80 parts by weight, still more preferably at least 100 parts by weight. Also more preferably, the uppermost limit of the water content is at most 1000 parts by weight, even more preferably at most 800 parts by weight, still more preferably at most 600 parts by weight. If the water content is larger than 1500 parts by weight, the time to be taken for drying the EVOH emulsion applied to substrates will be long; and if smaller than 60 parts by weight, the storage stability of the aqueous composition will be low.

EVOH (c2) has an ethylene content of from 5 to 15 mol % and a degree of saponification of at least 85%, and the uppermost limit of the degree of saponification thereof is not specifically defined. EVOH (c2) for use herein may have a degree of saponification of substantially 100%, but the uppermost limit of the degree of saponification thereof is preferably at most 99% in view of the solubility of EVOH (c2) in water. If EVOH (c2) has a degree of saponification of higher than 99%, its crystallinity will increase and its solubility in water will therefore lower, and, as a result, the storage stability of the EVOH emulsion will be poor.

The method of applying the barrier material (C) to the surface of the inner layer of the fuel container in a mode of solution coating or emulsion coating is not specifically defined. For example, preferred for the method is jetting the material toward the inner surface through a casting head, or roll coating, air knife coating, gravure roll coating, doctor roll coating, doctor knife coating, curtain flow coating, spraying, wire bar coating, rod coating, or brushing the material over the inner surface, or dipping the inner surface in a solution or emulsion of the material.

The fuel container of the invention is composed of thermo-formed, upper and lower sections of a multi-layer sheet. Therefore, in case where the barrier material (C) is applied to the inner surface of each thermo-formed multi-layer section in a mode of such solution coating or emulsion coating, a solution or emulsion of the barrier material (C) is poured into the cavity of each of the thermo-formed multi-layer sections (accordingly, the solution or emulsion is applied to the inner surface of each of the thermo-formed, upper and lower multi-layer sections that form the fuel container when they are bonded at their open-end edges), then the two sections are left as they are for a time (the time is not specifically defined, but preferably falls between a few seconds and tens of seconds or so), and thereafter the solution or emulsion is removed from the two sections, and the two sections are then dried. In that manner, the inner surface of each thermo-formed multi-layer section for the fuel container is coated with a layer of the barrier material (C). This process is especially preferred, as being simple.

Before the inner surface of each thermo-formed to form the fuel container of the invention is coated with the barrier material (C) in a mode of such solution coating or emulsion coating, it is desirable that the inner surface is subjected to treatment of corona discharging, sputtering, high frequency treatment, flaming, chromate treatment, solvent etching or their combination. This is primer treatment and enhances the mechanical strength of the film of the barrier material (C) formed on the thus-treated inner surface.

After the inner surface of each thermo-formed to form the fuel container has been subjected to such primer treatment, it is also desirable that the thus-treated inner surface is coated with an anchor coating adhesive, then dried, and thereafter coated with a solution or emulsion of the barrier material (C). The anchor coat further enhances the mechanical strength of the film of the barrier material (C) formed thereon. The anchor coating adhesive is not specifically defined, so far as it ensures good interlayer adhesiveness. For example, herein employable are polyurethane or polyester anchor coating adhesives.

The method of applying the anchor coating adhesive to the inner surface of each thermo-formed to form the fuel container of the invention is not specifically defined. For this, for example, employable is the same method as that mentioned hereinabove for the solution or emulsion coating of the barrier material (C). In view of its simplicity, the dipping method is preferred for this, like that for the barrier material (C).

The method of drying and heating the thus-coated sections is not specifically defined. Preferably, the coated sections are dried in a mode of dry heat treatment, for example, by exposing them to IR rays or hot air. The IR exposure and the hot air drying may be effected independently or may be combined.

Preferably, the temperature for the drying and heating treatment falls between 30 and 180° C. More preferably, its lowermost limit is 50° C. or higher, most preferably 80° C. or higher. Also preferably, the time for the drying and heating treatment falls between 5 seconds and 10 minutes, more preferably between 1 and 5 minutes. During the drying and heating treatment, the condition may be varied, for example, the temperature for the treatment may be elevated or lowered. For example, the coated sections may be treated first at a low temperature, and then their temperature may be gradually elevated.

In case where the inner surface of each thermo-formed to form the fuel container of the invention is coated with the barrier material (C) in a mode of solution or emulsion coating as above, the thickness of the coated layer of the barrier material (C) is not specifically defined. When the coated layer of the barrier material (C) is thick, the gasoline barrier properties of the fuel container will be better. However, if too thick, the layer of the barrier material (C) will be readily cracked. In view of the balance of the gasoline barrier properties and the cracking resistance of the layer, the thickness of the layer preferably falls between 0.1 and 50 $\mu$m, more preferably between 0.3 and 15 $\mu$m, even more preferably between 0.5 ad 10 $\mu$m, most preferably between 0.8 and 6 $\mu$m.

Another preferred method for coating the surface of the innermost layer of the fuel container of the invention with a layer of the barrier material (C) comprises spraying a powder of the barrier material (C) on the inner surface of each of the thermo-formed upper and lower sections to form the fuel container. Preferably, the powder is sprayed thereon according to a flame spray coating process, since the process is simple and since the layer of the barrier material (C) formed can strongly adhere to the inner polyolefin layer (B) of the fuel container.

For coating the surface of the innermost layer of a multi-layer fuel container with a layer of a barrier material (C), for example, a multi-layer sheet to be thermo-formed into upper and lower sections of the fuel container may be formed in a mode of co-extrusion molding of a barrier resin (A), a polyolefin (B) and a barrier material (C) so that its uppermost layer may be a layer of the barrier material (C), and the multi-layer sheet is then thermo-formed into upper and lower sections for a fuel container in such a manner that the layer of the barrier material (C) may be the innermost layer of each thermo-formed multi-layer section. In this method, the thus thermo-formed multi-layer sections are bonded to construct a fuel container, of which the surface of the innermost layer is thus coated with a layer of the barrier material (C).

However, as compared with this method, the method which we, the present inventors recommend herein, or that is, the method of coating the surface of the inner layer of each thermo-formed with a layer of the barrier material (C) in a mode of solution or emulsion coating or in a mode of powder coating has the following advantages.

One advantage is that the barrier material (C) is prevented from being deteriorated by heat, and, as a result, the layer of the barrier material (C) formed exhibits good gasoline barrier properties. As will be mentioned herein under, the barrier material (C) to be used in the present invention is preferably a polyvinyl alcohol resin such as EVOH since its gasoline barrier properties are good. However, polyvinyl alcohol resins such as EVOH are often deteriorated when heated for a long period of time in extrusion in the presence of oxygen, and often form fish eyes in their sheets formed. Therefore, in the process of ordinary co-extrusion to form a multi-layer sheet having an outermost EVOH layer, the EVOH layer is often deteriorated. As opposed to this, the method which we, the present inventors recommend herein, or that is, the method of coating the surface of the inner layer of each thermo-formed for the fuel container with a layer of the barrier material (C) in a mode of solution or emulsion coating or in a mode of powder coating is free from the problem of layer deterioration.

The fuel container of the invention is formed by bonding upper and lower sections, for which both the upper and lower sections are made by thermo-forming a multi-layer sheet that comprises an interlayer of a barrier resin (A) and inner and outer layers of a polyolefin (B). This is hereinafter referred to as a thermo-formed multi-layer fuel container.

As so mentioned hereinabove, the barrier material (C) for use in the invention is preferably a polyvinyl alcohol resin such as EVOH. When compared with that of polyolefin (B), the elongation of polyvinyl alcohol resin is generally low. Therefore, in case where the multi-layer sheet having an outermost layer of polyvinyl alcohol resin is thermo-formed, the wall thickness of the thermo-formed structure is often uneven as the outermost layer could not be well elongated.

Contrary to this, the method which we, the present inventors recommend herein, or that is, the method of coating the surface of the inner layer of each thermo-formed for the fuel container with a layer of the barrier material (C) in a mode of solution or emulsion coating or in a mode of powder coating is free from the problem of uneven wall thickness. This is because, in the preferred method of the invention, a multi-layer sheet that comprises an interlayer of a barrier resin (A) and inner and outer layers of a polyolefin (B) is thermo-formed into upper and lower sections for the container, and thereafter the inner surface of each thermo-formed is coated with the barrier material (C). This is another advantage of the preferred method of the invention.

The fuel container of the invention is formed by heat-sealing the open-end edges of two thermo-formed multi-layer sections. The open-end edges of the two sections to be heat-sealed will be referred to as heat-sealing open-end edges.

In case where the multi-layer sheet to be thermo-formed into upper and lower sections for the fuel container is formed in a mode of co-extrusion molding of a barrier resin (A), a polyolefin (B) and a barrier material (C) so that its uppermost layer may be a layer of the barrier material (C), and where the multi-layer sheet is then thermo-formed into two sections and the two sections are bonded to complete the fuel container, the layer of the barrier material (C) in one section is bonded to the layer thereof in the other section at the heat-sealing open-end edges of the two sections. In this case, the adhesion strength of the two bonded sections at the heat-sealed area is often low, and, as a result, the impact resistance of the fuel container is often low as a whole. This problem is similar to that with co-extrusion blow-molded containers having an innermost layer of EVOH in which the adhesion strength of the pinch-off part is low.

Contrary to this, the method which we, the present inventors recommend herein, or that is, the method of coating the surface of the inner layer of each thermo-formed for the fuel container with a layer of the barrier material (C) in a mode of solution or emulsion coating or in a mode of powder coating is free from the problem of poor adhesion strength of the heat-sealed area of the bonded sections. This is because, in the preferred method of the invention, the heat-sealing open-end edges of the two thermo-formed multi-layer sections for the fuel container can be prevented from being coated with a layer of the barrier material (C), and therefore, it is easy to evade the reduction in the adhesion strength of the heat-sealed area of the two sections. This is still another advantage of the preferred method of the invention.

In case where a thermo-formed multi-layer fuel container comprising an interlayer of a barrier resin (A) and inner and outer layers of a polyolefin (B) is produced, a method could be employed of disposing the interlayer of a barrier resin (A) to be more adjacent to the inner surface of the container, or that is, shifting it to the inside of the container, as in U.S. Pat. No. 6,033,749. When compared with the fuel container produced according to this method, the fuel container of the invention formed by bonding upper and lower sections, for which both the upper and lower sections are made by thermo-forming a multi-layer sheet that comprises an interlayer of a barrier resin (A) and inner and outer layers of a polyolefin (B), and of which the surface of the innermost layer is coated with a layer of a barrier material (C), has the following advantages.

One advantage is that the fuel container of the invention can be entirely recycled, as so mentioned hereinabove. This is because the innermost polyolefin layer (B) of the fuel container of the invention is prevented from being swollen with fuel. In addition, as its innermost layer is made of a barrier material (C), the fuel container of the invention ensures better gas barrier properties.

The thermo-formed multi-layer fuel container of which the barrier resin layer (A) is shifted to the inside of the container is problematic in that the adhesion strength of the heat-sealed area of the container is often low. Contrary to this, the interlayer barrier resin (A) can be disposed in the center of the multi-layer sheet to be thermo-formed into the sections of the fuel container of the invention. In addition, as so mentioned hereinabove, the heat-sealing open-end edges of the two sections to be bonded into the fuel container of the invention can be prevented from being coated with a layer of the barrier material (C). Therefore, in the fuel container of the invention, the adhesion strength of the heat-sealed area is readily prevented from being lowered. Accordingly, the fuel container has good gasoline barrier properties and has improved impact resistance. This is another advantage of the fuel container of the invention.

Through our studies made in detail, we, the present inventors have found that the impact resistance of the body part of the thermo-formed multi-layer container in which the barrier resin layer (A) is shifted to the inside of the container is low. The above-mentioned reference, U.S. Pat. No. 6,033, 749 says that the fuel container of which the barrier resin layer is shifted to the inside of the container has improved impact resistance. Our test results are quite contrary to the sayings in this reference. Though not clear, one reason will be because of the difference in the production method between the two. The fuel container disclosed in the reference U.S. Pat. No. 6,033,749 is produced in a mode of co-extrusion blow molding, while, different from it, the fuel container of the invention is formed by bonding thermo-formed, upper and lower multi-layer sections.

Another problem with co-extrusion blow-molded containers is that, when they have received a impact, most of them are broken at their pinch-off part before their bodies are broken. Therefore, for enhancing the impact resistance of such co-extrusion blow-molded containers, it is the most effective to enhance the impact resistance of the pinch-off part of the containers. Accordingly, no one would have made detailed studies about improving the impact resistance of the body part of co-extrusion blow-molded containers.

As opposed to this, the impact resistance of the heat-sealed part of thermo-formed multi-layer fuel containers could be enhanced in some degree by specifically planning the constitution of the heat-sealed part and by specifically selecting better conditions for heat-sealing the thermo-formed multi-layer sections. Accordingly, when having received a impact, the body part of thermo-formed multi-layer fuel containers is often crushed before the pinch-off part thereof is broken. As a result, it has become necessary to investigate in detail the impact resistance of the body part of the fuel containers.

Through our studies, we, the present inventors have found that the body part of thermo-formed multi-layer fuel containers is broken, when having received a impact, generally at the interlayer of a barrier resin (A) of the containers. In fact, in a drop test of dropping thermo-formed multi-layer fuel containers, which have an interlayer of a barrier resin (A) sandwiched between inner and outer layers of high-density polyethylene via an adhesive resin therebetween, from different heights, the barrier resin layer (A) was broken in some containers though the body part thereof was not completely crushed. The broken resin layer (A) in the containers tested is confirmed as follows: After the drop test, the containers are all separated into the upper and lower sections by cutting them at the heat-sealed part. The thus-separated sections are processed with hot xylene to thereby remove the inner layer and the adhesive resin layer of each section, and the barrier resin layer (A) thus exposed outside is checked for its condition.

In the drop test, many of thermo-formed multi-layer fuel containers of which the barrier resin layer (A) was shifted to the inside thereof were broken at the barrier resin layer (A), and, in addition, the height from which the fuel containers of the type were dropped and crushed was low. Though not clear, the reason will be because the impact applied to multi-layer fuel containers by dropping them from some heights will travel from their outer layer toward inner layer, and the stress resulting from the impact will be larger at their inner layer. As a result, it is presumed that, in the thermo-formed multi-layer fuel containers in which the barrier resin layer (A) is shifted to the inside thereof, the barrier resin layer (A) will be readily broken when they have received a impact.

In addition, if the barrier resin layer (A) not resistant to impact is broken, the entire body of the containers will be thereby broken. Therefore, if the barrier resin layer (A) is shifted to the inside of the containers, the thickness of the resin layer existing in the part nearer to the inside of the containers will be thereby reduced, and, as a result, the entire body of the containers will be more readily broken.

As opposed to the fuel containers of the type, the innermost layer of the fuel container of the invention is coated with a layer of a barrier material (C). Therefore, the fuel container of the invention has good gasoline barrier properties even when its barrier resin layer (A) is not shifted to the inside thereof. Accordingly, the fuel container of the invention is resistant to impact and has good gasoline barrier properties.

In particular, when the fuel container is produced according to the method which we, the present inventors recommend herein, or that is, according to the method of coating the surface of the inner layer of each thermo-formed multi-layer section for the container with a layer of the barrier material (C) in a mode of solution or emulsion coating or in a mode of powder coating, it brings about better results.

Specifically, when the surface of the inner layer of each thermo-formed multi-layer section for the fuel container is coated with a layer of the barrier material (C) in a mode of solution or emulsion coating or in a mode of powder coating, the barrier material layer (C) is not oriented at all, being different from that in a multi-layer film formed through extrusion. Therefore, even when the fuel container of the invention has received a impact, the impact does not travel in a predetermined direction only and the barrier material layer (C) of the fuel container is prevented from being cracked. Accordingly, though it has the barrier material layer (C) as its innermost layer, the fuel container of the invention has good impact resistance.

Still another advantage of the method of coating the inner surface of each thermo-formed multi-layer section for the fuel container with a layer of the barrier material (C) in a mode of solution or emulsion coating is that the thickness of the barrier material layer (C) can be reduced. Specifically, the thickness of the barrier material layer (C) can be controlled in any desired manner by changing the resin concentration of the solution or emulsion of the barrier material (C). Reducing the thickness of the barrier material layer (C) brings about the merits of reducing the production costs and more effectively preventing the layer (C) from being cracked.

In case where the inner surface of each thermo-formed multi-layer section for the fuel container is coated with a layer of the barrier material (C) in a mode of spray coating, more preferred is a flame spray coating process. Being different from the solution or emulsion coating process, it is not so easy to reduce the thickness of the layer of the barrier material (C) in the flame spray coating process. With a small-sized spray gun, the thickness of the barrier material layer (C) formed according to such a flame spray coating process can be reduced in some degree. However, using a small-sized spray gun in coating the inner surface of large-sized sections for fuel containers for automobiles is not economical.

The powder-coating method of coating the inner surface of thermo-formed multi-layer sections for fuel containers with a layer of the barrier material (C) is preferred to the solution or emulsion coating method, in some points. One is that good solvents for the barrier material (C) are not always easy to prepare, and it is often difficult to prepare solutions or emulsions of the barrier material (C). Therefore, the type of the barrier material (C) usable in the solution or emulsion coating method will be often limited, but not in the powder coating method.

The resin usable for the barrier material (C) having good gasoline barrier properties generally has a large solubility parameter. Concretely, one preferred example of the barrier material (C) for use in the invention is EVOH, and its solubility parameter (calculated according to the Fedors' formula) is generally over 11. On the other hand, the solubility parameter of high-density polyethylene, which is preferred for the inner and outer layers of the thermo-formed multi-layer fuel container of the invention, generally falls between 6 and 7 or so. Accordingly, the resin affinity between EVOH and high-density polyethylene is low, and when the two are laminated, the interlayer adhesiveness between them will be generally so good. For example, when EVOH and high-density polyethylene are laminated in a mode of co-extrusion, an adhesive resin is generally disposed between them in order to prevent interlayer peeling of the two.

Accordingly, when a substrate of high-density polyethylene is coated with EVOH in a mode of solution or emulsion coating and in order that the EVOH layer is firmly adhered to the substrate, it is recommended that the substrate is first subjected to primer treatment, then coated with an anchor coating material, dried, and thereafter coated with EVOH in a mode of solution or emulsion coating. However, the pre-treatment of the substrate is troublesome and costly.

Through our detailed studies, we, the present inventors have found that, when a substrate of a polyolefin (B) is sprayed with a powder of a barrier material (C), then the film of the barrier material (C) is firmly adhered to the polyolefin substrate (B) even though the substrate is not subjected to any specific primer treatment.

In one preferred embodiment of the invention, the polyolefin (B) is high-density polyethylene and the barrier material (C) is EVOH. As so mentioned hereinabove, when the layer of high-density polyethylene is coated with EVOH in a mode of solution or emulsion coating, the two layers of high-density polyethylene and EVOH could not always have good interlayer adhesiveness therebetween if the high-density polyethylene layer is not subjected to such specific, troublesome primer treatment. Even if the two layers of EVOH and high-density polyethylene are melt-laminated in a mode of co-extrusion, they could not still have satisfactory interlayer adhesiveness therebetween. As opposed to this, when a substrate of high-density polyethylene is coated with a melt of EVOH powder according to a flame spray coating process, the two layers of high-density polyethylene and EVOH exhibit extremely excellent interlayer adhesiveness therebetween. This is an extremely surprising finding.

As compared with the solution or emulsion coating method of coating the inner surface of each thermo-formed multi-layer section for the fuel container with a solution or emulsion of the barrier material (C), the powder-coating method of spraying it with a powder of the barrier material (C) facilitates the formation of a thick layer of the barrier material (C). Accordingly, in case where the fuel container is desired to have better gasoline barrier properties, preferably employed is the powder-coating method.

Also preferably, after the inner surface of each thermo-formed multi-layer section for the fuel container has been coated with a layer of the barrier material (C) in a mode of solution or emulsion coating, the part of each section through which the fuel permeation will be large is further sprayed with a powder of the barrier material (C). The part through which the fuel permeation will be large is concretely the corners of the fuel container and around the heat-sealed part thereof. However, if the heat-sealing open-end edges of the thermo-formed multi-layer sections for the fuel container are coated with the barrier material (C), the impact resistance of the fuel container formed by bonding the two sections will be low. Therefore, it is desirable that the heat-sealing open-end edges of the sections are masked in some method, and the area around the thus-masked part is coated with the barrier material (C). The masking method is not specifically defined. For example, the heat-sealing open-end edges are covered with a masking sheet (for example, aluminium sheet), or an adhesive masking tape (for example, adhesive aluminium tape) is stuck onto the heat-sealing open-end edges.

In case where the inner surface of each thermo-formed multi-layer section for the fuel container is sprayed with a powder of the barrier material (C), the thickness of the barrier material layer (C) formed is not specifically defined. However, in view of the balance of the gasoline barrier properties and the impact resistance of the fuel container produced, the thickness of the barrier material layer (C) formed in a mode of powder coating preferably falls between 1 and 500 μm. The lowermost limit of the thickness of the barrier material layer (C) is more preferably at least 5 μm, even more preferably at least 10 μm, still more preferably at least 20 μm, most preferably at least 20 μm; and the uppermost limit thereof is more preferably at most 300 μm, even more preferably at most 250 μm. If the thickness of the barrier material layer (C) is smaller than 1 μm, the gasoline barrier properties of the fuel container will be poor. If, however, it is larger than 500 μm, the layer (C) will peel off or will be cracked.

In case where the inner surface of each thermo-formed multi-layer section for the fuel container is sprayed with a powder of the barrier material (C), especially preferred for the coating is a flame spray coating process as ensuring higher adhesion strength of the barrier material layer (C) formed therein. Though not clear, the reason why the barrier material layer (C) formed according to such a flame spray coating process firmly adheres to the innermost polyolefin layer (B) of the thermo-formed multi-layer sections for the fuel container will be because, when the powdery barrier material (C) is sprayed through a nozzle onto the polyolefin layer (B) along with flames therethrough so as to make its melt adhere to the substrate, polyolefin layer (B), the surface of the polyolefin layer (B) will be processed with the flames to thereby enhance the interlayer adhesiveness between the barrier material layer (C) and the polyolefin layer (B).

In case where the barrier material (C) is sprayed on the polyolefin layer (B) according to such a flame spray coating process, the particles of the powdery barrier material (C) to be sprayed are preferably 20 to 100-mesh particles (JISK-8801), or that is, they pass through a 20-mesh screen but not through a 100-mesh screen. More preferably, they are 30 to 100-mesh particles. If a large amount of the powder not passing through a 20-mesh screen is used in a flame spray coating process, the nozzle will be clogged, and the film formed will be roughened. If so, the barrier material (C) sprayed could hardly form a smooth film. If, on the other hand, a large amount of the powder passing through a 100-mesh screen is used therein, the powder will be readily fired by the flames, and the cost necessary for preparing such fine powder will increase.

One preferred example of the barrier material (C) for use in the invention is EVOH. In case where EVOH for the barrier material (C) is sprayed on the polyolefin layer (B) according to a flame spray coating process, its melt flow rate (MFR, at 190° C. under a load of 2160 g) preferably falls between 0.1 and 50 g/10 min, more preferably between 1 and 40 g/10 min, even more preferably between 5 and 30 g/10 min. Regarding their MFR, samples having a melting point at around 190° C. or higher than 190° C. are measured at different temperatures not lower than their melting point under the same load of 2160 g, and the data obtained are plotted on a logarithmic graph of which the horizontal axis indicates the reciprocal of the absolute temperature and the vertical axis indicates the logarithm of MFR. On the graph, their MFR is extrapolated at 190° C. One or more different types of such EVOHs may be used herein either singly or as combined.

In case where the barrier material (C) is sprayed thereon according to a flame spray coating process, inner layer of the polyolefin (B) of each thermo-formed multi-layer section for the fuel container is preferably pre-heated. Pre-heating the polyolefin layer (B) further enhances the interlayer adhesiveness between the layer (B) and the barrier material layer (C) formed thereon. The temperature at which the polyolefin layer (B) is pre-heated is not specifically defined. Preferably, however, the polyolefin layer (B) is pre-heated at a temperature falling between 40 and 160° C., more preferably between 80 and 150° C., even more preferably between 100 and 150° C.

The method of pre-heating the polyolefin layer (B) of each thermo-formed multi-layer section for the fuel container is not also specifically defined. In one embodiment, the thermo-formed multi-layer sections for the fuel container may be entirely pre-heated all at a time. In another embodiment, only a part of the surface of each thermo-formed multi-layer section to be coated with the barrier material (C) may be pre-heated. In the latter method, the partial pre-heating treatment followed by the flame spray coating with the barrier material (C) may be repeated to thereby entirely coat all the intended area with the barrier material (C). For large-size fuel containers such as fuel tanks for automobiles, a lot of time will be taken to coat the inner surface of the thermo-formed multi-layer sections with the barrier material (C) according to a flame spray coating process. In such a case, if the thermo-formed multi-layer sections are entirely pre-heated all at a time, they will be deformed as the pre-heating time will be long. For such large-size fuel containers, therefore, the method of repeating the partial pre-heating treatment followed by the flame spray coating with the barrier material (C) is especially preferred.

The pre-heating treatment is not also specifically defined. One preferred example of the treatment is pre-heating the inner surface of thermo-formed multi-layer sections for the fuel container with flames. Concretely, the inner surface of each thermo-formed multi-layer section is pre-heated with flames up to a desired temperature, and, before cooled, it is coated with the barrier material (C) according to a flame spray coating process. For preventing the pre-heated surface from being cooled, one preferred method comprises first pre-heating the inner surface of each thermo-formed multi-layer section with flames up to a desired temperature (in this step, the barrier material (C) is not as yet applied to the surface), and thereafter spraying the barrier material (C) onto the thus pre-heated, hot surface in the same machine according to a flame spray coating process.

In case where the barrier material (C) is sprayed on the inner surface of the thermo-formed multi-layer sections according to a flame spray coating process, it is desirable that the distance between the nozzle of the flame spray-coating machine (e.g., spray gun) and the surface to be coated with the barrier material (C) falls between 10 and 30 inches, more preferably between 15 and 20 inches. In this case, it is also desirable that the nozzle traveling speed falls between 1 and 4 inches per second, more preferably between 2 and 3 inches per second.

The barrier resin (A) for use in the invention is preferably a thermoplastic resin through which the gasoline permeation amount is at most 100 g·20 $\mu$m/m$^2$·day (measured at 40° C. and 65% RH). More preferably, the uppermost limit of the gasoline permeation amount through the resin is at most 10 g·20 $\mu$m/m$^2$·day, even more preferably at most 1 g·20 $\mu$m/m$^2$·day, still more preferably at most 0.5 g·20 $\mu$m/m$^2$·day, most preferably at most 0.1 g·20 $\mu$m/m$^2$·day. Gasoline to be used for determining the gasoline permeation amount through the resin is a model gasoline of mixed toluene/isooctane (=1/1 by volume), which is referred to as Ref. fuel C.

Also preferably, the barrier resin (A) for use herein is at least one selected from a group consisting of ethylene-vinyl alcohol copolymers (EVOH), polyamides, aliphatic polyketones and polyesters. In view of their gasoline barrier properties, most preferred is EVOH.

Preferably, EVOH for the barrier resin (A) in the invention is a resin to be obtained by saponifying an ethylene-vinyl ester copolymer, and its ethylene content may fall between 5 and 60 mol %. The lowermost limit of the ethylene content of the resin is preferably at least 15 mol %, more preferably at least 25 mol %, even more preferably at least 30 mol %, still more preferably at least 35 mol %, most preferably at least 40 mol %. The uppermost limit of the ethylene content of the resin is preferably at most 55 mol %, more preferably at most 50 mol %. The melt moldability of EVOH having an ethylene content of smaller than 5 mol % is poor. On the other hand, the gasoline barrier properties and oxygen barrier properties of EVOH having an ethylene content of larger than 60 mol % are poor.

The degree of saponification of the vinyl ester moiety of EVOH for use in the present invention is at least 85%. Preferably, it is at least 90%, more preferably at least 95%, even more preferably at least 98%, most preferably at least 99%. The gasoline barrier properties and the oxygen barrier properties and even the thermal stability of EVOH having a degree of saponification of smaller than 85% are poor.

One typical example of the vinyl ester to be used for producing EVOH is vinyl acetate. However, any other vinyl esters of fatty acids (vinyl propionate, vinyl pivalate, etc.) are also usable for producing it. EVOH may contain from 0.0002 to 0.2 mol % of a comonomer, vinylsilane compound. The vinylsilane compound includes, for example, vinyltrimethoxysilane, vinyltriethoxysilane, vinyltri($\beta$-methoxy-ethoxy) silane, $\beta$-methacryloxypropylmethoxysilane. Of these, preferred are vinyltrimethoxysilane and vinyltriethoxysilane. Not interfering with the object of the invention, EVOH may be copolymerized with any other comonomers, for example, propylene, butylene, or unsaturated carboxylic acids and their esters such as (meth)acrylic acid, methyl (meth) acrylate, ethyl (meth)acrylate, etc., vinylpyrrolidones such as N-vinylpyrrolidone, etc.

Also not interfering with the object of the invention, a boron compound may be added to EVOH. The boron compound includes boric acids, borates, salts of boric acids, boron hydrides, etc. Concretely, boric acids include orthoboric acid, metaboric acid, tetraboric acid, etc.; borates includes trimethyl borate, triethyl borate, etc.; and salts of boric acids include alkali metal salts and alkaline earth metal salts of the above-mentioned boric acids, as well as borax, etc. Of these compounds, preferred is orthoboric acid. In case where such a boron compound is added to EVOH, the boron compound content of EVOH preferably falls between 20 and 2000 ppm, more preferably between 50 and 1000 ppm, in terms of the boron element.

Also preferably, EVOH for the layer (A) may contain from 5 to 5000 ppm, in terms of the alkali metal element, of an alkali metal salt. This further enhances the interlayer adhesiveness between the EVOH layer (A) and the inner and outer layers of polyolefin (B) of the fuel container of the invention.

More preferably, the alkali metal salt content of EVOH falls between 20 and 1000 ppm, even more preferably between 30 and 500 ppm, in terms of the alkali metal element. The alkali metal includes lithium, sodium, potassium, etc. The alkali metal salt includes mono-metal salts of aliphatic carboxylic acids, aromatic carboxylic acids and phosphoric acids, as well as mono-metal complexes, etc. For example, it includes sodium acetate, potassium acetate, sodium phosphate, lithium phosphate, sodium stearate, potassium stearate, sodium ethylenediaminetetraacetate, etc. Of these, preferred are sodium acetate and potassium acetate.

In view of the thermal stability, also preferably, EVOH for use in the invention contains a phosphate compound in an amount of from 20 to 500 ppm, more preferably from 30 to 300 ppm, most preferably from 50 to 200 ppm, in terms of the phosphate radical.

The type of the phosphate compound to be added to EVOH is not specifically defined. It includes various acids such as phosphoric acid, phosphorous acid, etc., and their salts. Any phosphate of any type of primary phosphates, secondary phosphates and tertiary phosphates may be in EVOH, and its cation is not specifically defined. Preferred are alkali metal salts and alkaline earth metal salts. Above all, especially preferred for the phosphate compound are sodium dihydrogenphosphate, potassium dihydrogenphosphate, disodium hydrogenphosphate and dipotassium hydrogenphosphate.

In case where the barrier resin (A) to form the interlayer of the multi-layered fuel container of the invention is EVOH, its melt flow rate (MFR, measured at 190° C. under a load of 2160 g) preferably falls between 0.01 and 100 g/10 min, more preferably between 0.05 and 50 g/10 min.

For EVOH having a melting point of around 190° C. or above 190° C., its MFR is measured under a load of 2160 g at different temperatures not lower than its melting point. The data are plotted on a semi-logarithmic graph with the horizontal axis indicating the reciprocal of the absolute temperature and the vertical axis indicating the logarithm of the melt flow rate measured, and the value corresponding to 190° C. is extrapolated from the curve of the thus-plotted data. One type of EVOH resin or two or more different types thereof may be used either singly or as combined.

Not interfering with the object of the invention, any of thermal stabilizers, UV absorbents, antioxidants, colorants, other resins (polyamides, polyolefins, etc.) and also plasticizers such as glycerin, glycerin monostearate or the like may be added to EVOH. Adding metal salts of higher aliphatic carboxylic acids and hydrotalcite compounds to EVOH is effective for preventing EVOH from being thermally degraded.

Examples of hydrotalcite compounds usable herein are double salts of $M_xAl_y(OH)_{2x+3y-2z}(A)_z \cdot aH_2O$ (where M represents Mg, Ca or Zn; A represents $CO_3$ or $HPO_4$; and x, y, z and a each are a positive integer). Preferred examples of the compounds are mentioned below.

$Mg_6Al_2(OH)_{16}CO_3 \cdot 4H_2O$ $Mg_8Al_2(OH)_{20}CO_3 \cdot 5H_2O$ $Mg_5Al_2(OH)_{14}CO_3 \cdot 4H_2O$ $Mg_{10}Al_2(OH)_{22}(CO_3)_2 \cdot 4H_2O$ $Mg_6Al_2(OH)_{16}HPO_4 \cdot 4H_2O$ $Ca_6Al_2(OH)_{16}CO_3 \cdot 4H_2O$ $Zn_6Al_6(OH)_{16}CO_3 \cdot 4H_2O$ $Mg_{4.5}Al_2(OH)_{13}CO_3 \cdot 3.5H_2O$ Also usable herein is a hydrotalcite solid solution, $[Mg_{0.75}Zn_{0.25}]_{0.67}Al_{0.33}(OH)_2(CO_3)_{0.167} \cdot 0.45H_2O$ described in Japanese Patent Laid-Open No. 308439/1989 (U.S. Pat. No. 4,954,557).

Metal salts of higher aliphatic carboxylic acids for use herein are those of higher fatty acids having from 8 to 22 carbon atoms. For those, higher fatty acids having from 8 to 22 carbon atoms include lauric acid, stearic acid, myristic acid, etc. Metals include sodium, potassium, magnesium, calcium, zinc, barium, aluminium, etc. Of those, preferred are alkaline earth metals such as magnesium, calcium, barium, etc.

The content of such a metal salt of a higher aliphatic carboxylic acid or a hydrotalcite compound to be in EVOH preferably falls between 0.01 and 3 parts by weight, more preferably between 0.05 and 2.5 parts by weight, relative to 100 parts by weight of EVOH.

Also preferably, the barrier resin (A) for the fuel container of the invention may be a resin composition comprising EVOH and a boronic acid-modified polyolefin. This further improves the impact resistance of the fuel container. In view of the balance of the gasoline barrier properties and the impact resistance of the fuel container, the resin composition for (A) preferably comprises from 60 to 99% by weight of EVOH and from 1 to 40% by weight of a boronic acid-modified polyolefin, more preferably from 70 to 98% by weight of EVOH and from 2 to 30% by weight of a boronic acid-modified polyolefin, even more preferably from 80 to 98% by weight of EVOH and from 2 to 20% by weight of a boronic acid-modified polyolefin.

The boronic acid-modified polyolefin for use in the invention is a polyolefin having at least one functional group selected from boronic acid groups, borinic acid groups, and boron-containing groups capable of being converted into boronic acid groups or borinic acid groups in the presence of water.

In the polyolefin having at least one functional group selected from boronic acid groups, borinic acid groups, and boron-containing groups capable of being converted into boronic acid groups or borinic acid groups in the presence of water, which is for use in the invention, at least one functional group selected from boronic acid groups, borinic acid groups, or boron-containing groups capable of being converted into boronic acid groups or borinic acid groups in the presence of water is bonded to the main chain, the side chain or the terminal via boron-carbon bonding therebetween. Of such polyolefins, preferred are those having the functional group bonded to the side chain or to the terminal. The terminal is meant to include one terminal and both terminals of the polymer. In view of their adhesiveness to the barrier material (B), especially preferred are polyolefins with the functional group bonded to the side chain.

The carbon of the boron-carbon bonding is derived from the base polymer of polyolefin to be mentioned below, or from the boron compound to be reacted with the base polymer. One preferred embodiment of the boron-carbon bonding is bonding of boron to the alkylene group in the main chain, the terminal or the side chain of the polymer. Boronic acid group-having polyolefins are preferred for use in the invention, and these will be described below. The boronic acid group referred to herein is represented by the following formula (I):

(I)

The boron-containing group capable of being converted into a boronic acid group in the presence of water (this will be hereinafter referred to as a boron-containing group) may be any and every boron-containing group capable of being hydrolyzed in the presence of water to give a boronic acid group of formula (I). Representative examples of the group are boron ester groups of the following general formula (II), boronic acid anhydride groups of the following general formula (III), and boronic acid salt groups of the following general formula (IV):

(II)

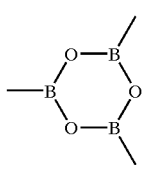
(III)

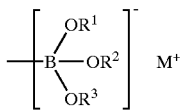
(IV)

wherein X and Y each represent a hydrogen atom, an aliphatic hydrocarbon group (e.g., a linear or branched alkyl or alkenyl group having from 1 to 20 carbon atoms), an alicyclic hydrocarbon group (e.g., a cycloalkyl group, a cycloalkenyl group), or an aromatic hydrocarbon group (e.g., a phenyl group, a biphenyl group); X and Y may be the same or different, and X and Y may be bonded to each other, but X and Y must not be hydrogen atoms at the same time; $R^1$, $R^2$ and $R^3$ each represent a hydrogen atom, an aliphatic hydrocarbon group, an alicyclic hydrocarbon group, or an aromatic hydrocarbon group, like X and Y, and $R^1$, $R^2$ and $R^3$ may be the same or different; M represents an alkali metal or an alkaline earth metal; and the groups X, Y $R^1$, $R^2$ and $R^3$ may have any other groups such as a carboxyl group, a halogen atom, etc.

Specific examples of the groups of formulae (II) to (IV) are boronic acid ester groups such as a dimethyl boronate group, a diethyl boronate group, a dipropyl boronate group, a diisopropyl boronate group, a dibutyl boronate group, a dihexyl boronate group, a dicyclohexyl boronate group, an ethylene glycol boronate group, a propylene glycol boronate group (1,2-propanediol boronate group, 1,3-propanediol boronate group), a trimethylene glycol boronate group, a neopentyl glycol boronate group, a catechol boronate group, a glycerin boronate group, a trimethylolethane boronate group, etc.; boronic acid anhydride groups; boronic acid alkali metal salt groups, boronic acid alkaline earth metal salt groups, etc. The boron-containing group capable of being converted into a boronic acid group or a borinic acid group in the presence of water is meant to indicate a group capable of being converted into a boronic acid group or a borinic acid group when the polyolefin containing it is hydrolyzed in water or in a mixed liquid comprising water and an organic solvent (toluene, xylene, acetone, etc.) at a reaction temperature falling between 25° C. and 150° C. and for a reaction time falling between 10 minutes and 2 hours.

The functional group content of the polymer is not specifically defined, but preferably falls between 0.0001 and 1 meq/g (milli-equivalent/g), more preferably between 0.001 and 0.1 meq/g.

The base polymer of the polyolefin which has the boron-containing group is a polymer of olefinic monomers of typically α-olefins such as ethylene, propylene, 1-butene, isobutene, 3-methylpentene, 1-hexene, 1-octene, etc.

The base polymer is a polymer of one, two, three or more of such monomers. For the base polymer, especially preferred are ethylenic polymers {very-low-density polyethylene, low-density polyethylene, medium-density polyethylene, high-density polyethylene, linear low-density polyethylene, ethylene-vinyl acetate copolymers, ethylene-acrylate copolymers, metal salts of ethylene-acrylic acid copolymers (Na, K, Zn ionomers), ethylene-propylene copolymers}.

A typical method for producing the olefinic polymers for use in the invention, which have a boronic acid group or a boron-containing group-having, is described. Olefinic polymers having a boronic acid group or a boron-containing group capable of being converted into a boronic acid group in the presence of water can be obtained by reacting a carbon-carbon double bond-having olefinic polymer with a borane complex and a trialkyl borate in a nitrogen atmosphere to give a dialkyl boronate group-having olefinic polymer followed by further reacting the resulting polymer with water or an alcohol. In case where an olefinic polymer having a double bond at the terminal is processed according to the method, the resulting olefinic polymer shall have a boronic acid group or a boron-containing group capable of being converted into a boronic acid group in the presence of water, at the terminal. On the other hand, in case where an olefinic polymer having a double bond in the side chain or in the main chain is processed according to the method, the resulting olefinic polymer shall have a boronic acid group or a boron-containing group capable of being converted into a boronic acid group in the presence of water, in the side chain.

Typical methods for producing the starting, double bond-having olefinic polymer are (1) a method of utilizing the double bond being present in a small amount at the terminal of an ordinary olefinic polymer; (2) a method of pyrolyzing an ordinary olefinic polymer in the absence of oxygen to give an olefinic polymer having a double bond at the terminal; and (3) a method of copolymerizing an olefinic monomer and a dienic polymer to give a copolymer of the olefinic monomer and the dienic monomer. For (1), usable is any known method of producing ordinary olefinic polymers, in which, however, preferably used is a metallocene polymerization catalyst, and hydrogen serving as a chain transfer agent is not used (for example, DE 4,030,399). In (2), an olefinic polymer is pyrolyzed in the absence of oxygen, for example, in a nitrogen atmosphere or in high vacuum at a temperature falling between 300° C. and 500° C. in an ordinary manner (for example, U.S. Pat. Nos. 2,835,659, 3,087,922). For (3), usable is a method for producing olefin-diene copolymers in the presence of a known Ziegler catalyst (for example, Japanese Patent Laid-Open No. 44281/1975, DE 3,021,273).

Starting from the double bond-having olefinic polymers produced in the above-mentioned methods (1) and (2), obtained are polyolefins having at least one functional group selected from boronic acid groups, borinic acid groups, and boron-containing groups capable of being converted into boronic acid groups or borinic acid groups in the presence of water, at the terminal. Starting from the double bond-having olefinic polymers produced in the method (3), obtained are polyolefins having the functional group in the side chain.

Preferred examples of the borane complex are borane-tetrahydrofuran complex, borane-dimethylsulfide complex, borane-pyridine complex, borane-trimethylamine complex, borane-triethylamine, etc. Of these, more preferred are borane-triethylamine complex and borane-triethylamine complex. The amount of the borane complex to be applied to the olefinic polymer preferably falls between $\frac{1}{3}$ equivalents and 10 equivalents to the double bond of the polymer. Preferred examples of the trialkyl borates are lower alkyl esters of boric acid such as trimethyl borate, triethyl borate, tripropyl borate, tributyl borate. The amount of the trialkyl borate to be applied to the olefinic polymer preferably falls between 1 and 100 equivalents to the double bond of the polymer. The solvent is not necessarily used for the reaction, but it is, when ever used, preferably a saturated hydrocarbon solvent such as hexane, heptane, octane, decane, dodecane, cyclohexane, ethylcyclohexane, decalin, etc.

For the reaction for introducing a dialkyl boronate group into olefinic polymers, the temperature preferably falls between 25° C. and 300° C., more preferably between 100 and 250° C.; and the time preferably falls between 1 minute and 10 hours, more preferably between 5 minutes and 5 hours.

For the reaction of the dialkyl boronate group-having olefinic polymer with water or an alcohol, generally used is an organic solvent such as toluene, xylene, acetone, ethyl acetate, etc. In such a reaction solvent, the olefinic polymer is reacted with a large excessive amount, from 1 to 100 equivalents or more to the boronate group in the polymer, of water or an alcohol such as methanol, ethanol, butanol or the like, or a polyalcohol such as ethylene glycol, 1,2-propanediol, 1,3-propanediol, neopentyl glycol, glycerin, trimethylolethane, pentaerythritol, dipentaerythritol or the like, at a temperature falling between 25° C. and 150° C. for from 1 minute to 1 day or so. Of the above-mentioned functional groups, the boron-containing group capable of being converted into a boronic acid group is meant to indicate a group capable of being converted into a boronic acid group when the polymer having it is hydrolyzed in water or in a mixed solvent of water and an organic solvent (toluene, xylene, acetone, etc.) for a reaction period of time falling between 10 minutes and 2 hours at a reaction temperature falling between 25° C. and 150° C.

Polyamides usable herein for the barrier resin (A) are amido bond-having polymers, including, for example, homopolymers such as polycapramide (nylon-6), polyundecanamide (nylon-11), polylauryllactam (nylon-12), polyhexamethylene adipamide (nylon-6,6), polyhexamethylene sebacamide (nylon-6,12); caprolactam/lauryllactam copolymer (nylon-6/12), caprolactam/aminoundecanoic acid polymer (nylon-6/11), caprolactam/ω-aminononanoic acid polymer (nylon-6,9), caprolactam/hexamethylenediammonium adipate copolymer (nylon-6/6,6), caprolactam/hexamethylenediammonium adipate/hexamethylenediammonium sebacate copolymer (nylon-6/6,6/6,12); aromatic nylons such as adipic acid/metaxylenediamine copolymer (hereinafter referred to as MXD-6), hexamethylenediamine/m,p-phthalic acid copolymer, etc. One or more of these polyamides are usable herein either singly or as combined.

Of these polyamides, preferred are nylon-6 and nylon-12, as having good gasoline barrier properties. In view of its oxygen barrier properties, preferred is adipic acid/metaxylenediamine copolymer (MXD-6).

Aliphatic polyketones usable for the barrier resin (A) in the invention are carbon monoxide-ethylene copolymers, which are obtained by copolymerizing carbon monoxide and ethylene, or by copolymerizing essentially carbon monoxide and ethylene with other unsaturated compounds except ethylene. The unsaturated compounds except ethylene include α-olefins having at least 3 carbon atoms, styrenes, dienes, vinyl esters, aliphatic unsaturated carboxylates, etc. The copolymers may be random copolymers or alternate copolymers. Alternate copolymers having a higher degree of crystallinity are preferred, in view of their barrier properties.

More preferred are alternate copolymers containing a third component in addition to carbon monoxide and ethylene, as their melting point is low and therefore their melt stability is good. α-olefins are preferred for the comonomer, including, for example, propylene, butene-1, isobutene, pentene-1, 4-methylpentene-1, hexene-1, octene-1, dodecene-1, etc. More preferred are α-olefins having from 3 to 8 carbon atoms; and even more preferred is propylene. The amount of the comonomer, α-olefin preferably falls between 0.5 and 7% by weight of the polyketone, as ensuring good crystallinity of the polymer. Another advantage of the polyketone of which the comonomer content falls within the defined range is that the coatability of the melt of its powder is good.

For the other comonomers, dienes preferably have from 4 to 12 carbon atoms, including butadiene, isoprene, 1,5-hexadiene, 1,7-octadiene, 1,9-decadiene, etc. Vinyl esters include vinyl acetate, vinyl propionate, vinyl pivalate, etc. Aliphatic unsaturated carboxylic acids and their salts and esters include acrylic acid, methacrylic acid, maleic anhydride, maleic acid, itaconic acid, acrylates, methacrylates, monomaleates, dimaleates, monofumarates, difumarates, monoitaconates, diitaconates (these esters may be alkyl esters such as methyl esters, ethyl esters, etc.), salts of acrylic acid, salts of maleic acid, salts of itaconic acid (these salts may be mono- or di-valent metal salts). Not only one but also two or more of these comonomers may be used in preparing the copolymers, either singly or as combined.

Polyketones for use herein may be produced in any known method, for example, according to the methods described in U.S. Pat. No. 2,495,286, and Japanese Patent Laid-Open Nos. 128690/1978, 197427/1984, 91226/1986, 232434/1987, 53332/1987, 3025/1988, 105031/1988, 154737/1988, 149829/1989, 201333/1989, 67319/1990, etc., but are not limited thereto.

Preferably, the melt flow rate (MFR, at 230° C. under a load of 2160 g) of the polyketone for use in the invention falls between 0.01 and 50 g/10 min, most preferably between 0.1 and 30 g/10 min. The polyketone has good fluidity, so far as its MFR falls within the defined range, and the coatability of the melt of a powder of the polyketone is good.

The polyolefin (B) for use in the invention is preferably any of olefin homopolymers or copolymers such as linear low-density polyethylene, low-density polyethylene, middle-density polyethylene, high-density polyethylene, ethylene-vinyl acetate copolymers, ethylene-propylene copolymers, polypropylene, propylene-α-olefin copolymers (in which the α-olefin has from 4 to 20 carbon atoms), polybutene, polypentene; and carboxylic acid-modified polyolefins, and boronic acid-modified polyolefins. Of those, especially preferred for the polyolefin (B) is high-density polyethylene in view of its toughness, impact resistance, shapability and gasoline resistance. The density of the high-density polyethylene for use herein preferably falls between 0.95 and 0.98 g/cm$^3$, more preferably between 0.96 and 0.98 g/cm$^3$.

In case where the surface of the innermost layer of the fuel container of the invention is coated with the barrier material (C) in a mode of solution or emulsion coating, the polyolefin (B) that forms the innermost layer of the fuel container is preferably a boronic acid-modified polyolefin, more preferably a resin composition comprising high-density polyethylene and a boronic acid-modified polyolefin.

One type of fuel container of which the innermost layer of polyolefin (B) is of substantially high-density polyethylene alone is compared with another type of which the innermost layer of polyolefin is of a resin composition comprising high-density polyethylene and a boronic acid-modified polyolefin. The former in which the polyolefin (B) is substantially high-density polyethylene alone is better than the latter, in point of its toughness, impact resistance, shapability and gasoline resistance. However, when the surface of the innermost layer of high-density polyethylene alone of thermo-formed multi-layer sections for the former type of fuel container is coated with a layer of the barrier material (C) in a mode of solution or emulsion coating, the preferred method for the coating comprises first subjecting the surface to primer treatment, then coating it with an anchor coating material, drying it, and finally coating it with the barrier material (C) in a mode of solution or emulsion coating, for ensuring good adhesion of the barrier material layer (e.g., EVOH layer) to the high-density polyethylene layer, as so mentioned hereinabove. However, the pre-treatment step of the method is troublesome and costly.

On the other hand, surprisingly in the latter type of fuel container where the polyolefin (B) for the innermost layer is a resin composition comprising high-density polyethylene and a boronic acid-modified polyolefin, the layer of the barrier material (C) formed in a mode of solution or emulsion coating on the innermost layer of the resin composition firmly adheres to the innermost layer, even though the surface of the innermost layer is not subjected to the complicated primer pre-treatment followed by further coating it with an anchor coating material and drying it. Accordingly, the complicated pre-treatment in the process of producing the latter type of fuel container can be omitted, and the production costs of the fuel container of the type are much reduced.

In case where the polyolefin (B) to form the innermost layer of the fuel container is a resin composition comprising high-density polyethylene and a boronic acid-modified polyolefin, the resin composition preferably comprises from 50 to 99% by weight of high-density polyethylene and from 1 to 50% by weight of a boronic acid-modified polyolefin, more preferably from 60 to 95% by weight of high-density polyethylene and from 5 to 40% by weight of a boronic acid-modified polyolefin, even more preferably from 60 to 90% by weight of high-density polyethylene and from 10 to 40% by weight of a boronic acid-modified polyolefin.

If the boronic acid-modified polyolefin content of the resin composition is smaller than 1% by weight, or if the high-density polyethylene content thereof is larger than 99% by weight, the adhesion strength of the layer of the barrier material (C) to the layer (B) of the resin composition will be low. If, on the other hand, the high-density polyethylene content of the resin composition is smaller than 50% by weight, or if the boronic acid-modified polyolefin content thereof is larger than 50% by weight, the mechanical strength of the fuel container having the layer (B) of the resin composition will be low.

The lowermost limit of the melt flow rate (MFR, measured at 190° C. under a load of 2160 g) of the polyolefin (B) for use in the invention is preferably at least 0.01 g/10 min, more preferably at least 0.05 g/10 min, even more preferably at least 0.1 g/10 min. The uppermost limit of the MFR of the polyolefin (B) is preferably at most 50 g/10 min, more preferably at most 30 g/10 min, most preferably at most 10 g/10 min.

The barrier material (C) for use in the invention is preferably a thermoplastic resin having a gasoline permeation rate of at most 400 g·20 $\mu$m/m$^2$·day (measured at 40° C. and 65% RH). If its gasoline permeation rate is over 400 g·20 $\mu$m/m$^2$·day (measured at 40° C. and 65% RH), the resin will be unsuitable for the barrier material. More preferably, the gasoline permeation rate of the barrier material (C) is at most 100 g·20 $\mu$m/m$^2$·day (measured at 40° C. and 65% RH), even more preferably at most 50 g20 $\mu$m/m$^2$·day (measured at 40° C. and 65% RH), still more preferably at most 10 g·20 $\mu$m/m$^2$·day (measured at 40° C. and 65% RH), most preferably at most 1 g20 m/m$^2$·day (measured at 40° C. and 65% RH).

Also preferably, the barrier material (C) for use in the invention is at least one selected from a group consisting of ethylene-vinyl alcohol copolymer (EVOH), polyamides, aliphatic polyketones, polyvinylidene chloride, polyvinylidene fluoride, and polyesters. EVOH, polyamides and aliphatic polyketones for the barrier material (C) may be the same as those for the barrier resin (A) mentioned hereinabove. In view of their gasoline barrier properties, preferred for the barrier material (C) are polyamides, polyesters and EVOH; and most preferred is EVOH.

The fuel container of the invention is formed by bonding upper and lower sections, for which both the upper and lower sections are made by thermo-forming a multi-layer sheet that comprises an interlayer of the barrier resin (A) and inner and outer layers of the polyolefin (B).

The method of thermo-forming the multi-layer sheet into upper and lower sections for the fuel container of the invention is not specifically defined. In any manner generally employed in the field of polyolefins, the multi-layer sheet is first prepared, and this is thermo-formed into upper and lower sections for fuel containers. For preparing the multi-layer sheet, for example, employed is any of T-die molding, co-extrusion or dry lamination. In particular, preferred for it is co-extrusion. The polyolefin (B) to form the inner and outer layers of the fuel container of the invention is preferably high-density polyethylene. In case where the multi-layer sheet is prepared through co-extrusion and where high-density polyethylene is used for the polyolefin (B), the interlayer of the barrier resin (A) therein is preferably sandwiched between the inner and outer layers of high-density polyethylene via an adhesive resin therebetween.

In that case, the adhesive resin preferably comprises a carboxylic acid-modified polyolefin. The carboxylic acid-modified polyolefin for use in the invention is a copolymer comprising an olefin, especially an α-olefin and at least one comonomer selected from a group consisting of unsaturated carboxylic acids and unsaturated carboxylic acid anhydrides, and it includes polyolefins having a carboxyl group in the molecule and those in which all or a part of the carboxyl group forms a metal salt. The base polyolefin of the carboxylic acid-modified polyolefin may be any type of polyolefins, and its preferred examples are polyethylene (e.g., high-density polyethylene (HDPE), low-density polyethylene (LDPE), linear low-density polyethylene (LLDPE), very-low-density polyethylene (VLDPE), etc.), polypropylene, propylene copolymers, ethylene-vinyl acetate copolymers, etc.

The unsaturated carboxylic acids include acrylic acid, methacrylic acid, maleic acid, monomethyl maleate, monoethyl maleate, itaconic acid, etc.; and especially preferred is acrylic acid or methacrylic acid. The unsaturated carboxylic acid content of the modified polyolefin preferably falls between 0.5 and 20 mol %, more preferably between 2 and 15 mol %, even more preferably between 3 and 12 mol %.

Examples of the unsaturated carboxylic acid anhydrides are itaconic anhydride, maleic anhydride, etc. Especially preferred is maleic anhydride. The unsaturated carboxylic acid anhydride content of the modified polyolefin preferably falls between 0.0001 and 5 mol %, more preferably between 0.0005 and 3 mol %, even more preferably between 0.001 and 1 mol %.

Examples of other monomers that can also be included as copolymer components in the carboxylic acid modified polyolefin are vinyl esters such as vinyl acetate and vinyl propionate; unsaturated carboxylic esters such as methyl acrylate, ethyl acrylate, isopropyl acrylate, isobutyl acrylate, n-butyl acrylate, 2-ethylhexyl acrylate, methyl methacrylate, isobutyl methacrylate, and diethyl maleate; and carbon monoxide.

The metal ion of the metal salt of the carboxylic acid-modified polyolefin includes, for example, alkali metals such as lithium, sodium, potassium, etc.; alkaline earth metals such as magnesium, calcium, etc.; transition metals such as zinc, etc. The degree of neutralization of the metal salt of the carboxylic acid-modified polyolefin may be up to 100%, but is preferably at most 90%, more preferably at most 70%. The lowermost limit of the degree of neutralization will be generally at least 5%, but preferably at least 10%, more preferably at least 30%.

Of the above-mentioned carboxylic acid-modified polyolefins, preferred are ethylene-methacrylic acid copolymers (EMAA), ethylene-acrylic acid copolymers (EAA), ethylene-methyl methacrylate copolymers (EMMA), maleic anhydride-modified polyethylenes, maleic anhydride-modified polypropylenes and their metal salts, in view of their adhesiveness to the barrier material (B). Especially preferred are ethylene-methacrylic acid copolymers (EMAA) and their metal salts.

Preferably, the lowermost limit of the melt flow rate (MFR, at 190° C. under a load of 2160 g) of the carboxylic acid-modified polyolefin for use in the invention is 0.01 g/10 min, more preferably at least 0.05 g/10 min, even more preferably at least 0.1 g/10 min. The uppermost limit of MFR thereof is preferably at most 50 g/10 min, more preferably at most 30 g/10 min, most preferably at most 10 g/10 min. These carboxylic acid-modified polyolefins may be used either singly or as combined to be a mixture of two or more of them.

Thermo-forming referred to herein is meant to indicate a technique of softening a sheet under heat followed by forming it into shaped articles in a mold. Preferred modes of thermo-forming herein are vacuum forming or pressure forming in a mold optionally assisted with a plug to thereby make a sheet shaped in accordance with the shape of the mold (e.g., straight forming, drape forming, air-slip forming, snap-back forming, plug-assisted forming), and press molding. The thermo-forming conditions including the temperature, the degree of vacuum, the degree of pressure, and the speed may be suitably determined, depending on the shape of the plug used, the shape of the mold used, and the properties of the sheet to be thermo-formed.

The temperature at which the multi-layer sheet is thermo-formed is not specifically defined, and it may be enough to soften the resins constituting the sheet. The preferred temperature range for thermo-forming varies, depending on the constitution of the multi-layer sheet.

For example, when the multi-layer sheet is thermo-formed, it is desirable that the temperature is not so high that the sheet is melted or the rough surface of the metal surface of the heater plate used is transferred onto the sheet at such a high temperature, but is not so low that the sheet could not be well shaped at such a low temperature. Concretely, it is desirable that the thermo-forming temperature falls between 130 and 200° C., more preferably between 135 and 195° C., even more preferably between 140 and 190° C.

For facilitating the thermo-forming operation, it is desirable that the multi-layer sheet is thermo-formed under a controlled condition under which the heat-sealing open-end edge of the thermo-formed structure is large in some degree. After having been thus thermo-formed, the unnecessary part of the thermo-formed structure may be cut off with a cutter. The step of cutting off the unnecessary part is referred to as trimming; and the cut-off part is referred to as trim.

The thus thermo-formed, upper and lower multi-layer sections are bonded by heat-sealing the open-end edges of the two sections to complete the fuel container of the invention. One preferred embodiment of the method of producing the fuel container of the invention comprises coating the inner surface of each thermo-formed multi-layer section with the barrier material (C) in a mode of solution or emulsion coating or in a mode of powder coating, and thereafter heat-sealing the open-end edges of the two sections to complete a fuel container.

Both the upper and lower thermo-formed sections for the fuel container of the invention are of a multi-layer sheet comprising an interlayer of the barrier resin (A) and inner and outer layers of the polyolefin (B). Preferred embodiments of the layer constitution of the multi-layer sheet are HDPE/AD/A/AD/HDPE, HDPE/AD/A/AD/REG, and HDPE/AD/A/AD/REG/HDPE. In these, A indicates a barrier resin layer; HDPE indicates a high-density polyethylene layer; AD indicates an adhesive resin layer; and REG indicates a reground layer of trim or scrap recycled in the thermo-forming process. However, the layer constitution of the multi-layer sheet in the invention is not limited to these embodiments. If desired, the reground powder of recycled trim or scrap (REG) may be blended in the HDPE layer or in the AD layer.

In general, the mechanical strength of the reground layer is often lower than that of the high-density polyethylene layer. In case where the fuel container of the invention has received an external impact, the stress to the impact occurs in the inner layers of the container whereby the container is deformed, and as the case may be, it is crushed or broken. Therefore, in the fuel container of the invention, it is desirable that the reground layer which is relatively not so strong is disposed outside the layer of the barrier resin (A). However, in case where much trim is formed or where a large amount of resin must be recycled, it is also desirable that the reground layer is disposed on the both outer sides of the layer of the barrier resin (A).

The thickness constitution of the multi-layer sheet for use in the invention is not also specifically defined. In view of the shapability and the cost of the sheet, it is desirable that the thickness of the barrier resin layer (A) falls between 1 and 20% of the overall thickness of the sheet. Concretely, it is desirable that the overall thickness of the multi-layer sheet falls between 1000 and 7000 μm and the thickness of the barrier resin layer (A) falls between 50 and 500 μm.

The fuel container of the invention has good gasoline barrier properties and good impact resistance, as so mentioned hereinabove, and is therefore favorable to gasoline tanks for automobiles.

EXAMPLES

The invention is described in more detail with reference to the following Examples, which, however, are not intended to restrict the scope of the invention.

(1—1) Evaluation of the Fuel Permeation Amount of the Barrier Resin (A)

A specimen of a layered product including a layer of barrier resin (A) was prepared as explained below, the fuel permeation amount of this layered product was determined, and converted into the permeation amount of barrier resin (A) of a predetermined thickness.

The high-density polyethylene (HDPE) BA-46-055 (having a density of 0.970 g/cm$^3$, and a MFR of 0.03 g/10 min at 190° C. and 2160 g) by Paxon was used; for the adhesive resin, ADMER GT-6A (having a MFR of 0.94 g/10 min at 190° C. and 2160 g) by Mitsui Chemicals, Inc. was used. A barrier resin (A) to be tested, the high-density polyethylene and the adhesive resin were given into separate extruders, and a coextrusion sheet with a total thickness of 120 μm having the structure high-density polyethylene/adhesive resin/barrier resin (A)/adhesive resin/high-density polyethylene (film thickness 50 μm/5 μm/10 μm/5 μm/50 μm) was obtained by extrusion molding. In the above coextrusion sheet molding, the high-density polyethylene was extruded from an extruder (barrel temperature: 170 to 210° C.) having a uniaxial screw of 65 mm diameter and L/D=24, the adhesive resin was extruded from an extruder (barrel temperature: 160 to 210° C.) having a uniaxial screw of 40 mm diameter and L/D=22, and the barrier resin (A) was extruded from an extruder (barrel temperature: 170 to 210° C.) having a uniaxial screw of 40 mm diameter and L/D=22 into a feed-block-type die (600 mm width and temperature adjusted to 210° C.) to obtain a coextrusion sheet (a1).

One side of the coextrusion sheet (a1) was covered with aluminum adhesive tape (product by FP Corp., trade name "Alumi-seal"; fuel permeation amount of 0 g·20 μm/m$^2$·day), thereby obtaining the aluminum-covered sheet (b1).

Both the coextrusion sheet (a1) and the aluminum-covered sheet (b1) were cut into pieces of 210 mm×300 mm size. Then these pieces were folded in the middle so their size became 210 mm×150 mm, and using the Heat Sealer T-230 by Fuji Impulse Co., pouches were prepared by heat-sealing of any two sides with dial 6 so that the seal width becomes 10 mm. Thus, pouches (a2) made of the coextrusion sheet only and aluminum-covered pouches (b2) were obtained. The aluminum-covered pouches (b2) were made so that the aluminum layer was on the outside.

Then, 200 ml of Ref. fuel C (toluene/isooctane=1/1) was filled as model gasoline into the pouches through the opening portions, and then the pouches were heat-sealed with a sealing width of 10 mm by the afore-mentioned method.

The pouches, filled with gasoline, were shelved in an explosion-proof thermo-hygrostat chamber (at 40° C. and 65% RH), and the weight of the pouches was measured every seven days over a period of three months. This experiment was carried out on five each of the coextrusion sheet pouches (a2) and the aluminum-covered pouches (b2). The weight of the pouches before and during the shelf-test was measured, and the gasoline permeation amount (fuel permeation amount) was calculated from the slope of a curve prepared according to the weight change of the pouches over the shelf time.

The fuel permeation amount of the pouches (a2) made only of the coextrusion sheet corresponds to the sum of the permeation amount through the pouch surface and through the heat-sealing portions, whereas the fuel permeation amount of the aluminum-covered pouches (b2) corresponds to the permeation amount through the heat-sealing portions. {fuel permeation amount through (a2)}−{fuel permeation amount through (b2)} was taken as the fuel permeation amount per 10 μm of the barrier resin (A). Converting this into the permeation amount per 20 μm of a barrier resin (A) layer, the resulting value was taken as the fuel permeation amount (g·20 μm/m$^2$·day) of the barrier resin (A).

(1–2) Evaluation of the Fuel Permeation Amount of the Barrier Resin (C)

The fuel permeation amount was measured using the same method as for the barrier resin (A).

Synthesis Example 1

1000 g of very-low-density polyethylene {MFR, 7 g/10 min (at 210° C. under a load of 2160 g); density, 0.89 g/cm$^3$; terminal double bond content, 0.048 meq/g} and 2500 g of decalin were put into a separable flask equipped with a condenser, a stirrer and a dropping funnel, then degassed at room temperature under reduced pressure, and thereafter purged with nitrogen. To this were added 78 g of trimethyl borate and 5.8 g of borane-triethylamine complex, and reacted at 200° C. for 4 hours. Next, an evaporator was fitted to the flask, and 100 ml of methanol was gradually dripped thereinto. After methanol was thus added thereto, the system was evaporated under reduced pressure to remove low-boiling-point impurities such as methanol, trimethyl borate and triethylamine from it. Next, 31 g of ethylene glycol was added to the system, and stirred for 10 minutes. Acetone was added thereto for re-precipitation, and the deposit was taken out and dried. The product thus obtained is boronic acid-modified very-low-density polyethylene having an ethylene glycol boronate content of 0.027 meq/g and having MFR of 5 g/10 min (at 210° C. under a load of 2160 g).

Example 1

For high-density polyethylene (HDPE), used was Paxon's BA46-055 (having a density of 0.970 g/cm$^3$, and an MFR at 190° C. under 2160 g of 0.03 g/10 min); and for adhesive resin, used was Mitsui Chemical's Admer GT-6A (having an MFR at 190° C. under 2160 g of 0.94 g/10 min). 10 parts by weight of the boronic acid-modified ultra-low-density polyethylene produced in Synthesis Example 1, and 90 parts by weight of EVOH having an ethylene content of 32 mol %, a degree of saponification of 99.5 mol %, and an MFR at 190° C. under 2160 g of 1.3 g/10 min (its gasoline permeation rate is 0.003 g·20 μm/m$^2$·day) were put into a vented, twin-screw extruder, and extruded through it at 220° C. in the presence of nitrogen, and then pelletized into resin composition pellets. The resin composition (having a gasoline permeation rate of 0.003 g·20 μm/m$^2$·day) was used for the barrier resin (A). The high-density polyethylene, the adhesive resin and the EVOH resin composition were fed into separate extruders, and co-extruded into a multi-layer sheet (a1) having a layer constitution of high-density polyethylene/adhesive resin/barrier resin (A)/adhesive resin/high-density polyethylene (thickness constitution: 1350 µm/90 µm/120 µm/90 µm/1350 µm) and having an overall thickness of 3000 µm.

For the co-extrusion to give the multi-layer sheet (a1), the extruder for the high-density polyethylene is a single-screw extruder having a diameter of 65 mm and L/D of 24, and the polymer was extruded through it at a temperature falling between 170 to 210° C.; the extruder for the adhesive resin is a single-screw extruder having a diameter of 40 mm and L/D of 22, and the resin was extruded through it at a temperature falling between 160 to 210° C.; and the extruder for the barrier resin (A) is a single-screw extruder having a diameter of 40 mm and L/D of 22, and the resin was extruded through it at a temperature falling between 170 and 210° C. The temperature of the feed-block die (having a width of 600 mm) was 210° C.

Next, the thus co-extruded multi-layer sheet (a1) was cut into a size of 20 cm×30 cm, set in a thermo-forming machine (from Asano Seisaku-sho), and thermo-formed at 190° C. into an open structure having a length of 10 cm, a width of 20 cm and a depth of 5 cm.

The unnecessary part of the heat-sealing open-end edge of this structure was trimmed off so that the width of its heat-sealing open-end edge could be 1 cm. Thus trimmed, this is a structure (a2). Its surface area is about 0.05 m².

On the other hand, for the barrier material (C), pellets of EVOH having an ethylene content of 48 mol %, a degree of polymerization of 99.6% and an MFR of 13.1 g/10 min (at 190° C. under a load of 2160 g) were ground in a low-temperature grinder (with liquid nitrogen therein) into powder. The resulting powder was dressed through sieving screens to collect its part having passed through a 40-mesh screen but not through a 100-mesh screen.

The thus-dressed powdery barrier material (C) was sprayed onto the entire inner surface (of the innermost layer) of the thermo-formed multi-layer structure (a2) prepared in the above, except the area of the heat-sealing open-end edge thereof, according to a flame spray coating process in the manner mentioned below, to thereby form thereon a layer of the barrier material (C) having a thickness of 100 µm, and then left cooled in air. The heat-sealing open-end edge of the structure (a2) was masked with aluminium plate to prevent it from being coated with the barrier material (C).

Concretely, the inner surface of the structure (a2) was first heated up to 130° C. by flaming it with an Innotex's spray gun through which flames alone not with the barrier material (C) were directed thereto. During the flaming treatment, the temperature of the inner surface of the structure (a2) was monitored with a thermometer of Coleparmer Instrument's Type J.

Next, the inner surface of the structure (a2) was further flamed with the spray gun through which flames along with the barrier material (C) were directed thereto according to a flame spray coating process to thereby coat it with the barrier material (C). In the flame spray coating treatment, the distance between the inner surface of the structure (a2) to be coated and the tip of the nozzle of the spray gun was about 17 inches, and the nozzle was moved at a speed of about 2 to 3 inches per second so that the thickness of the layer of the barrier material (C) formed on the inner surface of the structure (a2) could be about 100 µm.

Two structures (a2) thus coated with the barrier material (C) except their heat-sealing open-end edges were prepared, and they were heat-sealed at their open-end edges to complete a model fuel container.

The model fuel containers thus produced herein were tested for their fuel permeation rate and drop-impact strength according to the methods mentioned below. The test data are given in Table 1.

(1) Gasoline Permeation Rate

A hole having a diameter of 3 cm was made through one side of 10 cm×20 cm of the model fuel container produced in the manner as above. The side having the hole of the container is hereinunder the upper side thereof. Through the hole, 180 ml of model gasoline, Ref. fuel C (toluene/isooctane=50/50 by volume) was put into the container, and the hole was sealed with an aluminium sheet having a size of 5×5 cm and a thickness of 0.5 mm, firmly adhered thereto with an epoxy adhesive. In this step, the epoxy adhesive was carefully applied around the hole so that it fully cover even the exposed cross section of the hole.

The fuel container with the model gasoline therein was kept in a explosion-proof thermo-hygrostat (40° C., 65% RH) for 2 weeks. After thus kept for 2 weeks, the weight of the fuel container was measured. This is the initial weight of the fuel container. After its weight was measured, the fuel container with the model gasoline therein was again kept in the same explosion-proof thermo-hygrostat for further 3 months, and then its weight was measured. From its weight loss after 3 months, the gasoline permeation rate of the fuel container was obtained.

(2) Drop-Impact Strength

A hole having a diameter of 3 cm was made through one side of the model fuel container in the same manner as in (1). Through its hole, 180 ml of a commercially-available non-freezing solution and not the model gasoline was put into the fuel container. The hole was sealed with an aluminium tape (FP Chemical's commercial product, Alumiseal). The fuel container with the non-freezing solution therein was kept in a thermostat at −40° C. for 6 hours or more. Ten fuel containers thus prepared were dropped at a height of 10 m with their hole kept facing the upside, and the number of the broken fuel containers was counted.

Example 2

Model fuel containers were produced and tested in the same manner as in Example 1, except that EVOH having an ethylene content of 32 mol %, a degree of saponification of 99.5 mol %, an MFR at 190° C. under 2160 g of 1.3 g/10 min, and a gasoline permeation rate of 0.003 g·20 µm/m²·day was used for the barrier resin (A) herein. The test data are given in Table 1.

Example 3

For the barrier material (C), prepared was a solution of EVOH having an ethylene content of 32 mol %, a degree of saponification of 99.5 mol %, an MFR at 190° C. under 2160 g of 4.0 g/10 min, and a gasoline permeation rate of 0.003 g·20 µm/m²·day, according to the process mentioned below.

A three-neck flask equipped with a stirrer and a globe-valved cooler was set in a water bath at 70° C. Next, 850 g of a mixed solvent of n-PrOH and water (50/50 by weight) was put into the three-neck flask, and with stirring it, 150 g of EVOH was gradually put into the flask. Still with stirring it, the water bath was heated, and stirring it was continued until EVOH completely dissolved in the solvent to be a solution. The EVOH concentration of the solution was 15% by weight.

The inner surface (of the innermost layer) of the thermo-formed multi-layer structure (a2) produced in the same manner as in Example 1 was coated with the EVOH solution (EVOH concentration: 15% by weight) prepared in the above, according to the process mentioned below.

For its primer treatment, the inner surface of the structure (a2) was first flamed for about 1 second with a gas burner (Mitsuwa Rikagaku Kogyo's electronic gas torch GT-5000). Next, the heat-sealing open-end edge of the thus primer-treated structure (a2) was masked with an aluminium tape (FP Chemical's commercial product, Alumiseal), and an urethane-type anchor-coating agent (Toyo Morton's AD335A/Cat-10) was poured into the structure (a2) and left as such for 10 seconds. With that, the structure (a2) was inclined to remove the anchor-coating agent.

The thus anchor-coated structure (a2) was dried at 80° C. for 3 minutes, and then the EVOH solution for the barrier material (C) was poured thereinto, and left as such for 10 seconds. Next, the structure (a2) was again inclined to remove the EVOH solution, and dried at 110° C. for 5 minutes. After dried, the thickness of the barrier material (C), EVOH layer was about 10 μm.

The aluminium tape was removed from the heat-sealing open-end edge of the structure (a2) of which the inner surface was coated with the barrier material (C). Two structures (a2) thus coated with the barrier material (C) were prepared, and they were heat-sealed at their open-end edges to complete a model fuel container.

The model fuel containers thus produced herein were tested for their fuel permeation rate and drop-impact strength in the same manner as in Example 1. The test data are given in Table 1.

Example 4

An emulsion of EVOH was prepared according to the process mentioned below.

An ionic group-having, modified EVOH (c1) (this is a random copolymer with 0.3 mol %, relative to EVOH, of sodium 2-acrylamido-2-methylpropanesulfonate, and has an ethylene content 32 mol %, a degree of saponification of 99.6 mol % and a degree of polymerization of 800) was dissolved in a mixed solvent of water/methyl alcohol (50/50) to be a solution having an EVOH content of 10% by weight. 50 parts by weight of the EVOH solution was added to and mixed with 28 parts by weight of EVOH (c2) having an ethylene content of 32 mol %, a degree of saponification of 99.5 molt and a degree of polymerization of 1000, 100 parts by weight of methyl alcohol and 100 parts by weight of water, and stirred under heat at 65° C. to prepare a solution.

With stirring, this solution was cooled to 10° C., and it became a stable dispersion with particles precipitated therein. In this, the particles had a mean particle size of 0.1 μm. Next, water and methyl alcohol were evaporated from the dispersion stirred at 20° C. under reduced pressure. Thus was obtained an emulsion of EVOH. The particles in the EVOH emulsion had a mean particle size of 0.1 μm, and the water content of the EVOH emulsion was 300 parts by weight relative to Electronics' ELS-8000, according to a light-scattering method.

On the other hand, water containing 20% by weight of EVOH (c3) (this has an ethylene content of 5 mol %, a degree of saponification of 98 mol % and a degree of polymerization of 500) was stirred at 80° C. to prepare an aqueous EVOH (c3) solution. Next, the aqueous EVOH (c3) solution was added to the EVOH emulsion prepared in the above, with stirring. In the EVOH emulsion thus finally prepared herein contained 10 parts by weight of EVOH (c3) relative to 100 parts by weight of EVOH (c2).

Model fuel containers were produced in the same manner as in Example 3, except that the EVOH emulsion finally prepared herein was used in place of the EVOH solution used in Example 3. The thickness of the barrier material layer (C) formed on the inner surface of each fuel container was 3 μm.

The model fuel containers thus produced herein were tested for their fuel permeation rate and drop-impact strength in the same manner as in Example 1. The test data are given in Table 1.

Comparative Example 1

Model fuel containers were produced in the same manner as in Example 1. For these, however, the inner surface of the thermo-formed multi-layer structures (a2) was not coated with the barrier material (C). The model fuel containers thus produced herein were tested for their fuel permeation rate and drop-impact strength in the same manner as in Example 1. The test data are given in Table 1.

Comparative Example 2

Model fuel containers were produced in the same manner as in Comparative Example 1. For these, however, the co-extruded multi-layer sheet (a1) had a layer constitution of high-density polyethylene/adhesive resin/barrier resin (B)/adhesive resin/high-density polyethylene (thickness constitution: 2400 μm/90 μm/120 μm/90 μm/300 μm) and had an overall thickness of 3000 μm; and this was thermo-formed into multi-layer structures (a2) with the 300 μm-thick high-density polyethylene layer facing the inside. The model fuel containers thus produced herein were tested for their fuel permeation rate and drop-impact strength in the same manner as in Example 1. The test data are given in Table 1.

TABLE 1

|  | Fuel Permeation (g/3 months) | Drop-Impact Strength |
|---|---|---|
| Example 1 | 0.02 | None of 10 samples tested broken, with no leak of non-freezing solution |
| Example 2 | 0.02 | None of 10 samples tested broken, with no leak of non-freezing solution |
| Example 3 | 0.03 | None of 10 samples tested broken, with no leak of non-freezing solution |
| Example 4 | 0.03 | None of 10 samples tested broken, with no leak of non-freezing solution |
| Comp. Example 1 | 4 | None of 10 samples tested broken, with no leak of non-freezing solution |
| Comp. Example 2 | 2.5 | 7 of 10 samples tested broken |

What is claimed is:

1. A fuel container formed by bonding upper and lower sections, for which both the upper and lower sections are made by thermo-forming a multi-layer sheet that comprises an interlayer of a barrier resin (A) and inner and outer layers of a polyolefin (B), and of which the surface of the inner layer opposite to the interlayer is coated with a layer of a barrier material (C).

2. The fuel container as claimed in claim 1, wherein the barrier resin (A) is at least one selected from polyvinyl alcohol resins, polyamides and aliphatic polyketones.

3. The fuel container as claimed in claim 1, wherein the barrier resin (A) is an ethylene-vinyl alcohol copolymer having an ethylene content of from 5 to 60 mol % and a degree of saponification of at least 85%.

4. The method of producing a shaped article as claimed in claim 1, the barrier resin (A) is a resin composition comprising from 50 to 95% by weight of an ethylene-vinyl alcohol copolymer and from 5 to 50% by weight of a boronic acid-modified polyolefin.

5. The fuel container as claimed in claim 1, wherein the gasoline permeation through the barrier resin (A) is at most 100 g·20 $\mu$m/m$^2$·day, measured at 40° C. and 65% relative humidity.

6. The fuel container as claimed in claim 1, wherein the polyolefin (B) is high-density polyethylene.

7. The fuel container as claimed in claim 1, wherein the gasoline permeation through the barrier material (C) is at most 400 g·20 $\mu$m/m$^2$·day, measured at 40° C. and 65% relative humidity.

8. The fuel container as claimed in claim 1, wherein the barrier material (C) is at least one selected from the group consisting of polyvinyl alcohol resins, polyamide resins, aliphatic polyketones, polyester resins, polyvinyl chloride resins and polyvinylidene chloride resins.

9. The fuel container as claimed in claim 1, wherein the barrier material (C) is an ethylene-vinyl alcohol copolymer having an ethylene content of from 5 to 60 mol % and a degree of saponification of at least 85%.

10. The fuel container as claimed in claim 1, wherein the surface of the inner layer of the multi-layer sheet that constitutes the thermo-formed upper and lower sections is sprayed with a powder of the barrier material (C).

11. The fuel container as claimed in claim 10, wherein the surface of the inner layer of the multi-layer sheet that constitutes the thermo-formed upper and lower sections is sprayed with a powder of the barrier material (C) according to a flame spray coating process.

12. The fuel container as claimed in claim 10, wherein a powder of the barrier material (C) is sprayed over the surface of the inner layer of the multi-layer sheet that constitutes the thermo-formed upper and lower sections, at least around the bonded part of the sections, according to a flame spray coating process.

13. The fuel container as claimed in claim 10, wherein a powder of the barrier material (C) is sprayed over the surface of the inner layer of the multi-layer sheet, and the thickness of the coat layer of the barrier material (C) falls between 1 and 500 $\mu$m.

14. The fuel container as claimed in claim 1, wherein the surface of the inner layer of the multi-layer sheet that constitutes the thermo-formed upper and lower sections is coated with the barrier material (C) according to a solution coating or emulsion coating process.

15. The fuel container as claimed in claim 14, wherein the surface of the inner layer of the multi-layer sheet is coated with the barrier material (C) according to a solution coating or emulsion coating process, and the thickness of the coat layer of the barrier material (C) falls between 0.1 and 50 $\mu$m.

16. A fuel container as claimed in claim 1, further comprising fuel stored in said container.

* * * * *